Aug. 18, 1936.   T. B. TYLER   2,051,113
SELECTING AND SHIFTING MECHANISM FOR TRANSMISSIONS
Filed June 2, 1932   4 Sheets-Sheet 2

INVENTOR
Tracy Brooks Tyler
BY
ATTORNEY

Aug. 18, 1936.  T. B. TYLER  2,051,113

SELECTING AND SHIFTING MECHANISM FOR TRANSMISSIONS

Filed June 2, 1932  4 Sheets-Sheet 3

INVENTOR
Tracy Brooks Tyler
BY
ATTORNEY

Patented Aug. 18, 1936

2,051,113

UNITED STATES PATENT OFFICE 2,051,113

SELECTING AND SHIFTING MECHANISM FOR TRANSMISSIONS

Tracy Brooks Tyler, Detroit, Mich., assignor to The Monopower Corporation, Detroit, Mich., a corporation of Michigan Application June 2, 1932, Serial No. 614,945

16 Claims. (Cl. 192—.01)

This invention relates to selection and shifting mechanisms and more particularly to such mechanisms, used in connection with the transmissions of motor vehicles.

The principal aim of the invention is to provide automatic selecting and non-automatic shifting means for automobile transmissions, the selection being automatic or controllable by the speed of the vehicle, the act of shifting preselected parts being non-automatic or personally controllable.

The invention further aims to provide means in association with automatic selecting and non-automatic shifting mechanism for transmissions whereby the mechanism may be readily disconnected from other operating parts so as to permit the elements being selected, non-automatically, as well as shifted, non-automatically, the disconnecting means being readily operable by and easily accessible to the operator so that he can easily and quickly change over from automatic selection to non-automatic selection, and vice versa.

A characteristic of the shifting mechanism forming part of the invention lies in its being capable of association with engine control means and/or clutch control means.

Still further aims of the invention will become readily apparent from the following detailed description of the mechanism and from the appended drawings, in which—

It is at present contemplated that an automobile equipped with the selecting and shifting mechanism of this application will have an engine shaft connected to a drive shaft by a clutch, the drive shaft being connected to a propeller shaft by a torque change transmission.

The transmission parts may be selected and shifted, non-automatically by a shifting rail, indicated at 12 and actuated in conventional fashion by a shifting rod 13, actuated in turn by a shifting lever not shown. The shifting rod, which is outside the transmission casing 14, is connected to the shifting rail, inside the casing, by a gear sector 15 having teeth meshing with the rack teeth 16 on the shifting rail. The gear sector inside the casing is mounted on a stub shaft 17 projecting therefrom, to which stub shaft is also fixed a rocker arm 18, the latter being outside the casing and having elongated rollers 19 at its ends. The rocker arm 18 further has a portion 20 projecting upwardly from its hub, and this portion is connected to the shifting rod 13, at the connection 21. It will be seen that the shifting rail 12 may be moved by rod 13 through the rocker arm 18, stub shaft 17 and gear sector 15.

It will also be seen, from that which follows, that the shifting rail 12 may be moved for selection and shifting by means which engages the rocker arm 18 at its ends 19 and thus moves the stub shaft 17 and the gear sector 15.

Figures 7, 8, 9, 10:
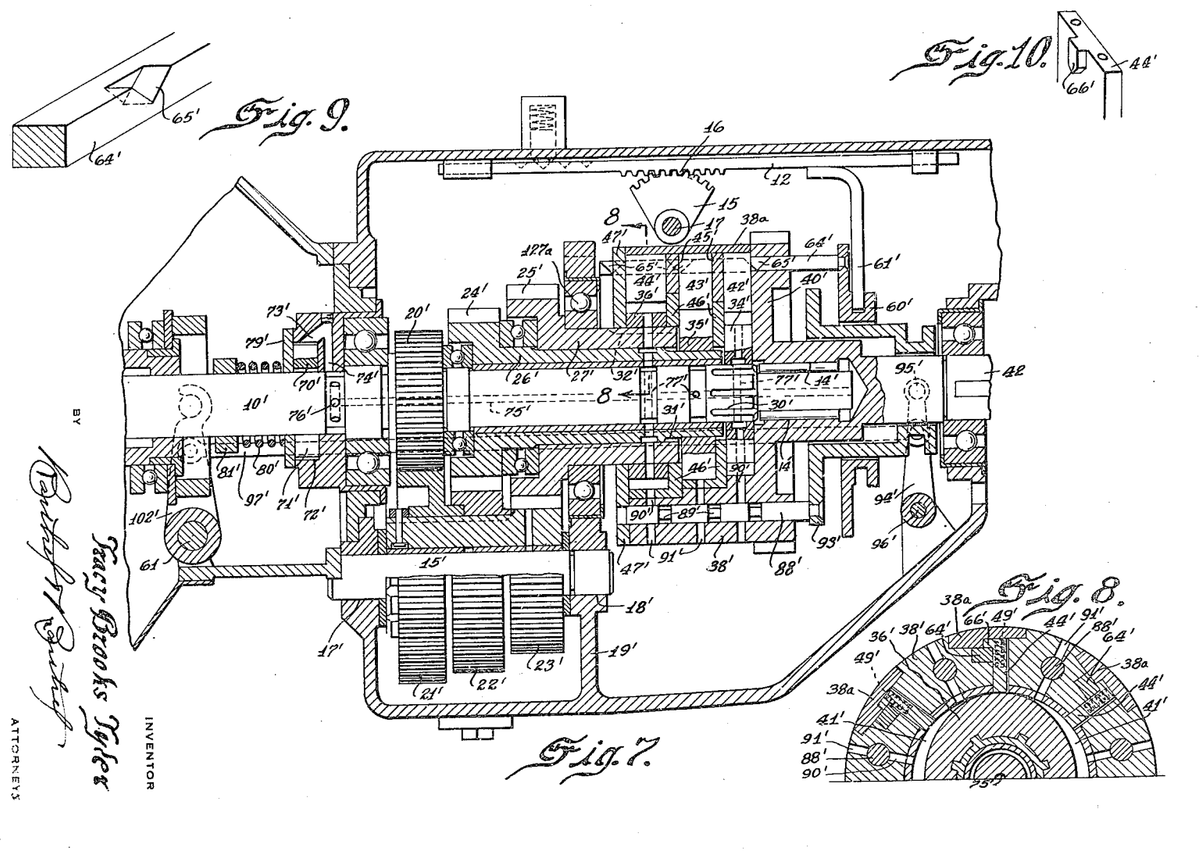
Fig. 7 is a vertical longitudinal section of a transmission.
Fig. 8 is a section taken on the line 8—8 of Fig. 7.
Figs. 9 and 10 are perspective views of details.

Referring more particularly to Figs. 7 and 8 there will be seen a transmission upon which the present selecting and shifting mechanism is adapted to be assembled. The particular construction of this transmission forms no part of the invention and is merely shown as an example of a transmission in order that the manner of control and operation of the invention may be understood. It will be seen that the transmission in these figures includes a suitably journaled main shaft 10' adapted to be connected to the engine of a vehicle through a conventional master clutch, not shown. The torque transmitting elements to be described in detail below are adapted to create a driving connection between the main shaft 10' and a suitably journaled second shaft or propeller shaft 42. The propeller shaft has an axial bore 14' in the end thereof in which is journaled the end of the main shaft 10'. A counter shaft 15' is journaled in the transmission casing 14 at 17', and is also journaled at 18' in a partition 19' formed integral with the casing, and in effect corresponds to the counter shaft in a conventional transmission. Formed integral with the main shaft 10' is a gear 20' in constant mesh with a gear 21' on the counter shaft and the latter further has gears 22' and 23' of different size, as shown, these constantly meshing with gears 24' and 25', also of different size, as shown, provided with relatively telescoping sleeves 26' and 27' journaled on a stationary ball bearing 127a in the partition 19'.

The shaft 10' and the sleeves 26' and 27' are provided with longitudinally spaced external splines 30', 31' and 32' respectively on which are splined three longitudinally spaced oval rotors 34', 35' and 36', these being the normally driving rotors of fluid clutches having a common normally driven member comprising a thick walled annulus or shell 38' formed integral with the shaft 42 and connected to the body portion thereof by an annular web 40'. The casing or shell is made long enough to surround all of the rotors and is spaced from them by the spaces 41' as shown in Fig. 8.

The driving connection between the shell 38' and the rotors 34', 35' and 36' is effected by a plurality of sets of vanes 42', 43' and 44' radially slidable in slots in the shell 38' capped by the parts 38a and these vanes are adapted to project into the spaces 41' and abut on the outer surfaces of the eccentrically shaped rotors 34', 35' and 36'. The sets of vanes and the rotors corresponding thereto are relatively isolated by sealing partitions including annular portions 45' integral with the shell 38' and dished plates 46' disposed as shown, and the otherwise open end of the shell is closed by an end plate 47' sealing the shell and the driving plates therewithin from the interior of the transmission case 14.

When one or another of the sets of vanes 42', 43' and 44' are pressed inwardly, towards the rotors, by compression springs 49', the liquid or other fluid in the spaces 41 between the shell and that rotor which corresponds with the projected vanes, creates a fluid engagement between the rotor and the shell, and serves to transmit rotary motion from the driving part on which it is splined, namely, the shaft 10' or the sleeves 26' and 27' to the shell.

It is obvious that some means must be provided to select which of the set of vanes will be projected inwardly, in order to permit selection of the driving means for the shell 38'. This means is composed of a shifter collar 60' which is rigidly mounted on selector rods to be described and which is connected by a yoke 61' to the slidable shift rail 12, actuated by the shift lever or other operator controlled means as described above. To the shifter 60' and projecting forwardly therefrom are a plurality of selectors 64' spaced peripherally at equal distance about the alined axes of the shafts 10' and 42. These selectors pass through the thick wall of the shell 38' and the end plate 47' and are slidable along with the grooved collar 60' in a direction parallel to the axes of the shafts 10' and 42. On those edges of the selectors which are in face to face engagement with the shell grooves and the faces of the vanes 42', 43' and 44' are three annular rows of V-shaped notches 65', any annular row of which, at any one time as desired, is adapted to register with one of three annular rows of V-shaped lugs 66' formed on the vanes 42', 43' and 44'. When the notch 65' is registered with a lug 66 on a vane the compression springs 49' will project the vane radially inwardly into the fluid filled space 41' until the vane is engaged by a rotor. At other times the vanes are held outwardly, due to the lugs 66' resting on the outer surfaces of the selectors, and no driving relation is established.

It will be seen that the notches 65' and the vane lugs 66' are spaced so that one, and only one, if any, annular row of notches 65' on the selectors will be in line with an annular row of vane lugs at any one time. Because of this a driving connection between the shell 38' and one of the rotors at any one time may be effected, the other rotors being non-operable to transmit torque to the shell because of the fact that their vanes are held out by the lugs 66' engaging on the upper surfaces of the selectors 64'. It will also be seen that the selectors not only permit the vanes to move inwardly but also operate to withdraw the vanes when properly moved, the notches being V-shaped for this purpose.

In order that the spaces 41' between the rotors and the shell 38' be at all times filled to capacity with driving liquid or other fluid a rotary pump is provided which includes a rotor 70' secured to the shaft 10' and having sliding vanes 71' for pumping fluid from the eccentrically shaped chamber 72' through a bore 73' and a radial passage 74' into an axial bore 75' formed in the shaft 10', the latter having radial passages 76' for connecting the bore 75' with the passage 74'. The bore at its end near the rotors is provided with three sets of radial outlets 77' passing through the rotors into the spaces 41' and serving to connect the interior of the pump chamber 72' with the spaces 41'. The pump is designed to operate and to supply fluid to the spaces 41' at a constant and low pressure and in order to prevent a high pressure being built up within the pump, one end of the pump is formed as a movable wall 79' held against the pump casing to close the chamber by a compression spring 80' abutting a fixed collar 81' on the shaft 10'. In the event that the pressure in the pump exceeds a predetermined amount the end plate 79' is forced away from the casing against the influence of the spring 80' to relieve the pressure in the pump and to permit escape of excess fluid in capacity volume.

The transmission includes means for completely disconnecting the propeller shaft from the shaft 10' in order to render all three of the above described torque transmission connections inoperative. This is accomplished by means which permits the escape of the fluid from the spaces 41' between the rotors and the shell, the said means including a group of longitudinally slidable parallelly disposed plungers 88' having annular grooves 89' adapted to register with alined ports 90' and 91' and when registered to open the interior of the shell to the interior of the transmission casing through the ports 90', 91' and grooves 89'. The plungers 88' are connected to a collar 93' and the collar may be moved forwardly by an arm 94' yoked to the collar at 95' and adapted to be rotated on a cross shaft 96' by a link 97' connected to the yoke 94' and a rocker yoke 102' on a clutch actuating shaft 61 and through parts partially shown but not referenced, to the means for actuating the master clutch. Inasmuch as the master clutch forms no part of the invention it has not been shown here.

The operation of the transmission parts is as follows; when the master clutch actuating means is moved to a position which would cause disengagement of the master clutch, the yoke 102' is rocked in a counter-clockwise direction and a yoke 97' is pulled to the left, thus causing rocking movement of the yoke 94', sliding movement of the collar 83' and advance of the plungers 88' and escape of the fluid from the shell. When the master clutch yoke 102' is moved to a position which would cause engagement of the master clutch the plungers 88' are retracted to stop free escape of the fluid from the shell and a driving connection between the selective rotor and the shell 88 will once more be established.

From the foregoing it becomes apparent that when the clutch actuating shaft 61 is rotated it causes the transmission to be rendered neutral and that lengthwise movement of the shifting rail 12 causes a different set of torque transmitting parts to be rendered operable.

At some little distance from the stub shaft 17, and also projecting from the transmission casing, is a tubular shaft 24, the latter serving as an axle for a plurality of shifting arms 25, 26 and 27, the number of these corresponding to the number of forwardly driving selections possible in the transmission, three only being shown in the particular embodiment illustrated, though it will be understood that any other number might well be used. The shifting arms are formed at their ends with angular yokes 25a, 26a and 27a which are adapted to engage the rollers 19 on the ends of the rocker arm 18 to move the latter and thereby to move the shifting rail, it being observed that the rocker arm 18 is wide enough to encompass all of the yokes on the ends of the shifting arms, although of course only one of these shifting arms is brought into engagement with the rocker arm at any one time. The angle at which the yokes 25a, 26a, and 27a extend relative to their respective arms is different in each case so that engagement of any one yoke with the rocker arm 18 causes the latter to rock to a position different than the position to which it would be rocked by engagement of either of the other two yokes.

Figure 1:
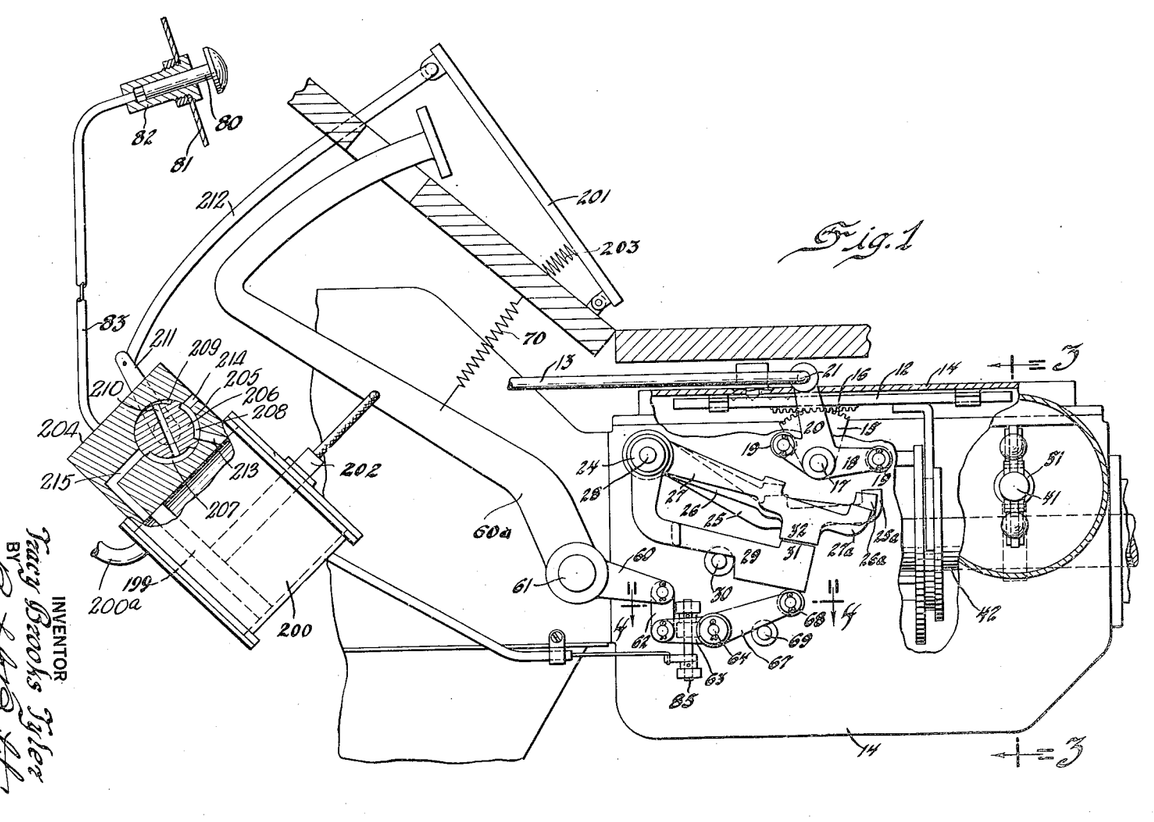
Figure 1 shows parts of a selecting and shifting mechanism, in elevation.
Figure 2:
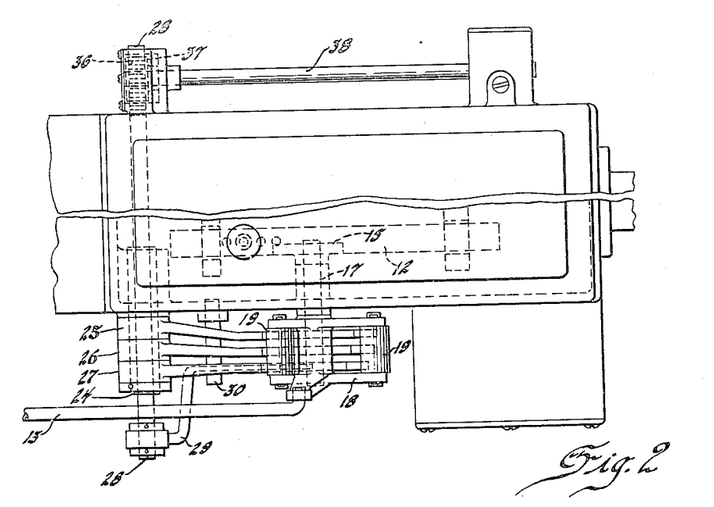
Fig. 2 shows certain of these parts in plan.

Projecting through and supported in the tubular shaft 24 and the transmission casing, as shown in Figure 2, is a second shaft 28 which is mounted to be slidable on its own axis. On the nearer end of the shaft 28 (Figure 1) is journaled a selector and shifter lever 29, the latter being L-shaped, when viewed in elevation and ogee shaped when viewed in plan. The selector and shifter lever, in its lowermost position rests upon a fixed stud 30 and on its upper surface bears a lug 31 which may be brought into engagement with any one of a number of lugs 32 on the undersides of the shifting arms 25, 26 and 27.

The selector and shifter lever 29 has two directions of movement, both for different reasons. The lever 29 along with the shaft 28 may be moved horizontally, by means operatively connected to the propeller shaft, to positions under one or another of the shifting arms, the amount of horizontal movement and therefore its position with respect to these arms being automatically determined and controlled by the speed of the propeller shaft in a manner to be described. The lever 29 may be moved upwardly non-automatically, by personally controlled means to cause one or another of the shifting arms to engage the rocker arm and thereby to move the shifting rail 12.

The horizontal movement of lever 29 will control the selection, that is to say, will determine which of the shifting arms will be moved and which of the elements in the transmission will be selected. The vertical movement of the lever 29 controls the fact of shifting, that is to say, when moved upwardly the lever 29 will cause the pre-selected shift to be made.

The means for selecting, that is to say, for moving selector 29 horizontally and positioning it under one or another of the shifting arms and for correlating such selection with the speed of the propeller shaft so as to form an automatic selecting mechanism, includes the elongated shaft 28 upon which the lever 29 is supported. This shaft is slidable in the casing to a limited extent and has rack teeth 36 at its far end (Fig. 2), meshing with a pinion gear 37 formed on the end of a control shaft 38, the latter having a second pinion 39 meshing with rack teeth formed on a slidable sleeve 40, the latter being connected to the end of a control actuator shaft 41, whose axial sliding movement is determined by the speed of the propeller shaft 42.

The propeller shaft is provided with a gear 43 meshing with a pinion 44 fixed to a non-slidable sleeve 45 journalling and rotating on the shaft 41. To one end of the sleeve 45 are pivotally connected the weighted arms 46 of a governor, these arms in turn being pivotally connected at 47 to links 48, which in turn are pivotally connected at 49 to a collar 50 rotatable on the shaft 41, the collar being restrained against sliding movement by fixed collars 51 on shaft 41. A spring 52 tends to move the shaft to the left, counteracting that influence of the arms 46 which tends to move shaft 41 to the right.

As the propeller shaft rotates it causes rotation of the weighted arms 46 and the position assumed by these varies with the speed of the propeller shaft. As the governor arms move away from the shaft 41 they cause the latter to slide in its bearings until the compression spring 55, telescoped between the shaft 41 and the sleeve 40, is compressed sufficiently to permit washers 56 to engage shoulders within the sleeve 40, whereupon the sleeve will move, due to movement of the shaft 41, against the restraining influence of the spring pressed check plunger 57, adapted to seat in one or another of the spaced notches 58 of the sleeve. This construction is provided so that the sleeve 40 will not move gradually in response to variations in speed of the propeller shaft 42, but will move with a "snap" action, distances equal to the spacing of the notches 58. The movement of sleeve 40 acting through the control shaft 38 and shaft 28, will cause "snap" movement of lever 29 under the shifting arms 25, 26 and 27. The restraining plunger 57 and the notches 58 are spaced to correspond to the spacing of the shifting arms and insure the lever 29 being moved into complete alignment with one or another of the shifting arms, not under two of them at one time.

Figure 4:
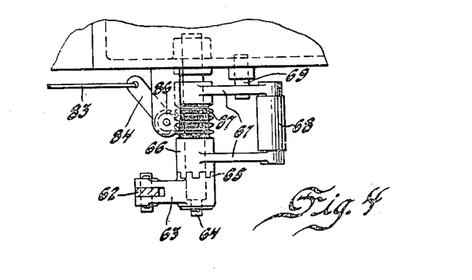
Fig. 4 shows part of the means for disconnecting the mechanism from other operating parts and in a section on line 4—4 of Figure 1.

The parts described immediately above constitute means for automatically determining selection and automatically correlating selection to the speed of the propeller shaft. Other parts constitute means for actuating the shifting part or rail and for non-automatically shifting automatically preselected elements in the transmission. These include a short extension 60 on a lever 60a mounted on a shaft 61, the extension being connected by a link 62 to an arm 63 journalled on a stationary shaft 64 mounted on and projecting from the transmission casing. The hub of arm 63 is provided with dog tooth clutch teeth 65, Fig. 4, meshing with cooperating teeth in the hub 66 of a double lever 67, the latter being journaled on shaft 64 and having an elongated roller 68 adapted to engage the under surface of selector lever 29. A stud 69 fixed to the casing forms a stop and a support for the double lever 67.

It will be seen that when the operator permits lever 60a to be moved upwardly by spring 70, lever 67 will be moved in a manner to move lever 29 against one or another of the automatically preselected shifter arms and thereby to move the shifting rail.

In order to disconnect the shift mechanism when it is desired to accomplish selection and shifting, non-automatically, thru rod 13, there are provided means including a control plunger 80 positioned on the dashboard 81 of the vehicle and mounted in a bushing 82 to slide therein, in response to the manipulation of the operator. The plunger 80 is connected by a Bowden wire or other flexible force transmitting element 83 to an arm 84 journaled on a stationary pin 85 mounted on the transmission casing. The shaft of the arm 84 is provided with a pinion gear 86 meshing with annular rack teeth 87 formed on the hub 66 of the double lever 67. It will be seen that when the plunger 80 is pulled out, the arm 84 is rotated to cause the lever 67 to move away from the arm 63, thus causing disengagement of the dog tooth clutch 65 and thus disconnecting the shifting mechanism from the lever 60a. So disconnected the shifting mechanism is not actuatable by the lever 60a, and selection and shifting must be accomplished manually, through rod 13, if at all. When the plunger 80 is returned to its innermost position, by being pushed in by the operator, the clutch engagement at 65 will be established once more and the automatic selecting and non-automatic shifting mechanism will once more be in connection with the lever 60a.

Figure 5:
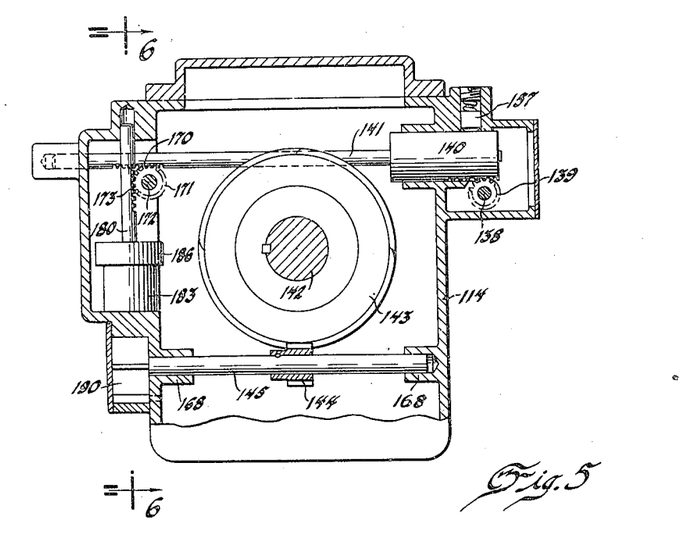
Figs. 5 and 6 show a second form of propeller shaft controlled means forming part of the selecting mechanism, and are sections on line 5—5 and 6—6 of Figures 6 and 5 respectively.
Figure 6:
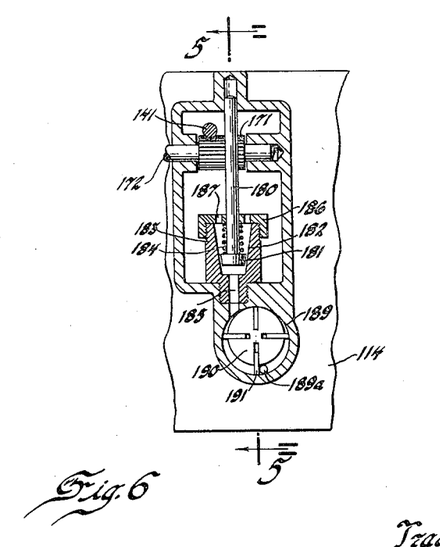

Another form of means for correlating the selection to the speed of the propeller shaft, and operating by fluid pressure rather than by centrifugal or governor action, is disclosed in Figs. 5 and 6. The means of these figures includes parts like those of the means disclosed in Figures 1 to 3, namely shaft 138, pinion 139, sleeve 140, actuator shaft 141, and restraining plunger 157. Further, the means of Figs. 5 or 6 is used in conjunction with a propeller shaft 142 having a gear 143 meshing with a pinion 144 fixed to a second shaft 145, the latter being journaled in bearings 168 formed in the casing 114. The actuator shaft 141 is provided with rack teeth 170 meshing with a pinion 171 formed on a stub shaft 172, this pinion further being meshed with the rack teeth 173 of a slidable shaft 180 whose vertical movement is correlated to the speed of the propeller shaft and is translated into corresponding horizontal movement in the actuator shaft 141. The slidable shaft 180 above mentioned has a tapered head 181 seated in the tapered chamber 182 of a valve body 183, there being a spring 184 for urging the shaft down into position to close the port 185. A cap 186 on body 183 has ports 187 for reasons given hereafter.

The port 185 opens into a rotor chamber 189 connected to the inside of the casing 114 through a port 189a and in which is eccentrically disposed a cylindrical rotor 190, the latter being fixed to the end of the rotating shaft 145 to rotate therewith. The rotor 190 is provided with sliding vanes 191 which, as the rotor rotates, cause transfer of lubricant from the lower interior of the casing, through ports 189a and 185, to the valve chamber 182, the lubricant then raising the valve shaft 180 and escaping around the head 181 of the same and out through the ports 187, back into the upper part of the casing 114.

It will be seen that the degree of lift of shaft 180 and consequently the degree of axial movement of actuator control rod 141 depends upon the speed of the rotor 190, for, as the speed of the latter increases due to an increase in the propeller speed, the volume of oil which passes the head 181 will increase. In this fashion, the position of the actuator control shaft 141 and the position of the selector lever 29 will be correlated to the propeller shaft speed.

It will also be seen that the double acting compression spring 55 acts to provide a "lag" or retarding action to the automatic shifting means, on deceleration, as follows: The selector will move from a higher speed position to a lower speed position, not as soon as the propeller shaft decelerates to the predetermined shifting speed, but only after the shaft speed has fallen somewhat below the predetermined speed.

Figure 3:
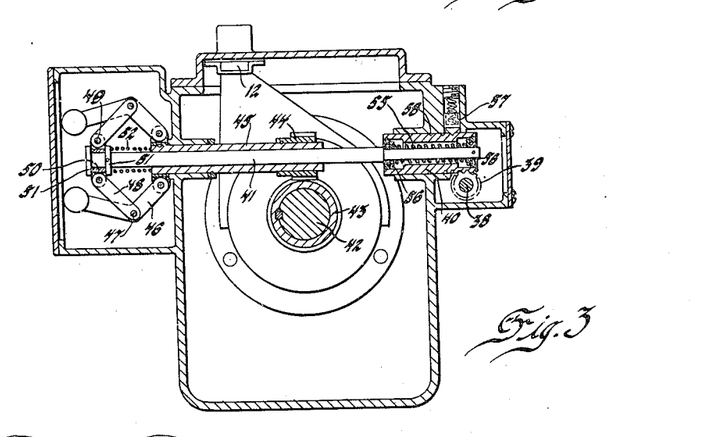
Fig. 3 shows one form of propeller shaft controlled means forming part of the automatic selecting mechanism, and is a section on line 3—3 of Figure 1.

For example, if the shifting speed, from "second" to "high" is fixed at 20 miles per hour, the selector will move from "second" to "high" at 20 miles per hour but will move from "high" to "second" on deceleration, at let us say ten miles per hour. This function is due to the fact that the shaft 41 moves to the right from the position shown in Fig. 3 when the vehicle speed is accelerated, and when the increase in vehicle speed is great enough the governor moves the shaft 41 to the right to compress the spring 55 and cause the washer 56 to engage the shoulder in the sleeve 40. The sleeve 40 is thus moved and the selection made. Assuming that this action takes place at a vehicle speed of twenty miles per hour it is obvious that a movement of the sleeve 40 to the left to select a lower gear ratio would take place at a vehicle speed less than twenty miles per hour due to the fact that the speed of governor must be decreased sufficiently to cause movement of the shaft 41 to the left as illustrated in Fig. 3. When the shaft 41 is moved to the left until its washer engages a shoulder in the sleeve 40 further movement of the shaft 41 will move the sleeve and make a selection of a lower gear. The restraining plunger 57 holds the sleeve stationary during movement of the shaft 41 toward the left until such time as the washer on the shaft positively engages the sleeve.

Accordingly, the transmission will remain in "high", longer on deceleration, than would be the case were such a device not provided, and undesirable and unnecessarily often shifting of the transmission parts from high to lower speeds, due to momentary slow-downs, as in heavy traffic conditions, will be avoided.

It will also be seen that the automatic selecting and shifting means of this application differs from any of those previously contemplated, in that while selection is accomplished automatically, and in correlation to the speed of the vehicle, the act of shifting from one grouping to another is under the complete control of the operator. For this reason, it is possible for the operator to drive the vehicle with the transmission in the condition he desires even though the speed of the vehicle may automatically cause a changed condition of the selector.

An important feature of the invention lies in the association of lever 60a with other parts of the vehicle, and these associations will now be described:

(1) The shaft 61 upon which lever 60a is mounted, may be keyed to lever 60a so as to rotate therewith, and it may form a clutch actuation shaft for the master clutch of the vehicle, the pedal head of lever 60a in such a case being a master clutch pedal. The parts may be so designed that the pedal lever 60a, when depressed, causes master clutch disengagement, and when permitted to be returned by spring 70, cause clutch reengagement. Under these circumstances, the act of shifting is concurrent with the initial part of the act of permitting master clutch reengagement. Shifting will not occur, until the master clutch is disengaged and then permitted to reengage. The act of shifting is not automatic, but is personally controlled, and is accomplished as part of the act of permitting clutch reengagement.

(2) As illustrated in Fig. 1 the lever 60a may be actuated by a power actuator. The power actuator is composed of a cylinder 200 having a movable plunger 199 therein having a connector 202 with one end attached thereto and its other end attached to the lever 60a. Connected into one end of the cylinder 200 is a pipe line 200a whose other end is adapted to be connected to a source of suction such as the intake manifold of an automotive vehicle engine in the manner well known in the art and therefore not shown here. Integral with the cylinder 200 is a valve body 204 having a chamber 205 in which is a rotary valve 206, the latter having relief channels 207, 208 and 209. The channels 207 and 209 are connected by a transverse bore 210. The valve 206 is provided with an external crank 211 which is connected by a rod 212 to a pedal 201 which is normally held in the position illustrated by a spring 203.

The cylinder 200 has a port 213 which opens into the valve chamber 205 from one side of the piston 199. A port 214 connects the chamber 205 to the atmosphere, and a port 215 connects the chamber 205 to the cylinder 200 on the other side of the piston 199.

In operation, when suction is present in the line 200a and the valve 206 is positioned as shown, air at atmospheric pressure enters one end of the cylinder through ports 213 and 214 and due to the rarified condition in the other end of the cylinder the piston 199 moves to cause the pedal 60a to move. When the pedal 201 is moved, by manual pressure thereon, the valve 206 will be rotated counterclockwise, whereupon the pressure behind the plunger 199 will be relieved, the air bleeding out through the port 213, the relief 207, the bore 210, the relief 209, and port 215 to the low pressure side of the cylinder, thus permitting the spring 70 to retract the clutch pedal 60a.

If, as will preferably be the case, lever 60a is not only connected to an actuator, but is also connected to the master clutch of the vehicle, then the act of shifting is made concurrent with the initial part of the act of clutch reengagement, whether the latter be effected through the pedal head of lever 60a or through the controller 201.

Further, the association between the transmission actuation and the clutch actuation can be destroyed immediately, at any time, and without difficulty, through plunger 80, whereby transmission actuation is not affected or controlled by clutch actuation or engine throttling.

Operation

The operation of the automatic gear selecting and non-automatic shifting mechanism described above, will now be described in connection with a schedule of vehicle operations.

First, assume the clutch to be actuated pedally through lever 60a;

(1) Initially the engine will be running, the clutch will be engaged, the transmission elements will be in "neutral", and the selector lever 29 will be positioned under the "low gear" shifting arm; the plunger 80 will, or should be in to render the automatic shift connections operable.

(2) To start the vehicle, the lever 60a is pushed inwardly to disengage the clutch and the plunger 80 will be pushed inwardly; the operator then releases lever 60a, and the clutch will start towards engaging position; at the same time, the selector 29 will move up, this shifting the elements to low; the operator simultaneously steps on the throttle pedal and the vehicle moves off, in low gear;

(3) When the vehicle attains its low gear speed, the operator takes his foot off the throttle pedal, and simultaneously depresses the lever 60a to disengage the clutch; at this time, the selector lever 29 will drop, and will then move horizontally to a position under the "second" shifting arm, by the propeller shaft control mechanism; the operator then releases lever 60a, to shift the elements to "second" and to engage the clutch; simultaneously, he depresses the throttle pedal, and the vehicle moves off in "second" speed;

(4) The same cycle of movements takes place in shifting from "second" to high gear.

In the event the clutch is actuated by a power mechanism, such as would normally be used, the operation will be as follows:

(1) Initially, the engine will be running, and, due to engine suction, the clutch will be disengaged; the torque transmitting elements will be in "neutral" and the selector 29 will be in "low" position; the plunger 80, if retracted, will be advanced;

(2) To start the vehicle, the controller 201 and the throttle pedal are depressed, whereupon the elements will be shifted in "low"; fuel will be fed to the engine, and the clutch will become engaged; the vehicle will move off in "low" speed.

(3) At a satisfactory "low" speed, the operator releases the manipulator and throttle pedal, whereupon the clutch will become disengaged, and the fuel flow will be reduced, the selector will drop and move horizontally to "second" position; when the operator steps on the manipulator and throttle pedal, the elements will be shifted to "second", the engine will be speeded up and the clutch will become engaged; the vehicle moves off in "second".

(4) The cycle is repeated, to shift from "second" to "high".

It will be noted, at this time, that change-over from automatic selection to manual selection, and vice versa, may be effected instantly and easily, and at any speed of the vehicle, all without any attendant difficulties.

Now having described the inventions, together with preferred embodiments thereof, it will be understood that the scope of the same will be determined, not by the foregoing detailed description, but by the claims which follow:

1. In an automotive vehicle, a clutch actuator, a driving part whose speed corresponds to that of the vehicle, a drive shaft, a plurality of torque transferring elements, groupings of which may be selected for use in connecting the driving part to the drive shaft, means responsive to the speed of the driving part for selecting a grouping of the torque transferring elements and for correlating the selection to the speed of the vehicle, and means operable by the clutch actuator, on clutch engagement movement thereof, to cause a selected grouping of said torque transferring elements to be shifted into cooperative relation.

2. In an automotive vehicle having a clutch actuator, a driving part whose speed corresponds to that of the vehicle, and a plurality of torque transferring elements, groupings of which may be selected, means operatively connected to the clutch actuator, and to the driving part by a speed responsive device, for selecting groupings of the torque transferring elements, and for shifting the same into cooperative relation, said means being automatically operable to select a grouping, on change of speed of the driving part, when the clutch actuator is in clutch disengaged position, and being automatically operable to shift the grouping into cooperative relation upon initial movement of the actuator towards clutch engaged position.

3. In an automotive vehicle having a clutch actuator, a driving part whose speed corresponds to that of the vehicle, and a plurality of torque transferring elements, groupings of which may be selected, means operatively connected to the clutch actuator, and to the driving part by a speed responsive device, for selecting groupings of the torque transferring elements, and for shifting the same into cooperative relation, said means being automatically operable to select a grouping, on change of speed of the driving part, when the clutch actuator is in clutch disengaged position, and being automatically operable to shift the grouping into cooperative relation upon initial movement of the actuator towards clutch engaged position, there being means controllable by the operator for causing movement of the actuator to the latter position, whereby the operator can time the shifting action of the shifting means.

4. In an automotive vehicle having a clutch actuator, a driving part whose speed corresponds to that of the vehicle, and a plurality of torque transferring elements, groupings of which may be selected, means operatively connected to the clutch actuator, and to the driving part of a speed responsive device, for selecting groupings of the torque transferring elements, and for shifting the same into cooperative relation, said means being automatically operable to select a grouping, on change of speed of the driving part, when the clutch actuator is in clutch disengaged position, and being automatically operable to shift the grouping into cooperative relation upon initial movement of the actuator towards clutch engaged position, there being means controllable by the operator for causing movement of the actuator to the latter position, whereby the operator can time the shifting action of the shifting means, there also being means easily operable by and readily accessible to the operator, while he is driving the vehicle, for rendering said shifting means inoperable.

5. In combination with a plurality of torque transferring elements, selection and shifting of which is accomplished through a rocker arm pivotally mounted between its ends, a plurality of pivotally mounted shifter arms having yoke-like ends for engaging the ends of the rocker arm, the latter being of a width greater than that of all the arm ends combined, a pivotally mounted selector lever movable across but clear of all of the arms and adapted to be moved towards and into engagement with any one of them, means for moving said lever across the arms and for insuring its registry with one and only one of them, at any one time, and means for moving said lever into engagement with the arm registered therewith, thereby to move the latter against and to actuate the rocker arm.

6. In combination with a plurality of torque transferring elements, selection and shifting of which is accomplished through a rocker arm pivotally mounted between its ends, a plurality of pivotally mounted shifter arms having yoke-like ends for engaging the ends of the rocker arm, the latter being of a width greater than that of all the arm ends combined, a pivotally mounted selector lever movable across but clear of all of the arms and adapted to be moved towards and into engagement with any one of them, means for moving said lever across the arms and for insuring its registry with one and only one of them, at any one time, and means for moving said lever into engagement with the arm registered therewith, thereby to move the latter against and to actuate the rocker arm, the shifter arms being arranged differently from one another, with respect to the rocker arm, so that movements imparted thereto by them will vary, depending upon which shifter arm is moved.

7. In combination with a plurality of torque transferring elements, selection and shifting of which is accomplished through a rocker arm pivotally mounted between its ends, a plurality of pivotally mounted shifter arms having yoke-like ends for engaging the ends of the rocker arm, the latter being of a width greater than that of all the arm ends combined, a pivotally mounted selector lever movable across but clear of all of the arms and adapted to be moved towards and into engagement with any one of them, means for moving said lever across the arms and for insuring its registry with one and only one of them, at any one time, and means for moving said lever into engagement with the arm registered therewith, thereby to move the latter against and to actuate the rocker arm, the shifter arms being arranged differently from one another, with respect to the rocker arm, so that movements imparted thereto by them will vary, depending upon which shifter arm is moved, the first mentioned means being automatically controlled by a speed responsive device.

8. In combination with a plurality of torque transferring elements, selection and shifting of which is accomplished through a rocker arm pivotally mounted between its ends, a plurality of pivotally mounted shifter arms having yoke-like ends for engaging the ends of the rocker arm, the latter being of a width greater than that of all the arm ends combined, a pivotally mounted selector lever movable across but clear of all of the arms and adapted to be moved towards and into engagement with any one of them, means for moving said lever across the arms and for insuring its registry with one and only one of them, at any one time, and means for moving said lever into engagement with the arm registered therewith, thereby to move the latter against and to actuate the rocker arm, the shifter arms being arranged differently from one another, with respect to the rocker arm, so that movements imparted thereto by them will vary, depending upon which shifter arm is moved, the second mentioned means being under personal control.

9. In combination with a plurality of torque transferring elements, selection and shifting of which is accomplished through a rocker arm pivotally mounted between its ends, a plurality of pivotally mounted shifter arms having yoke-like ends for engaging the ends of the rocker arm, the latter being of a width greater than that of all the arm ends combined, a pivotally mounted selector lever movable across but clear of all of the arms and adapted to be moved towards and into engagement with any one of them, means for moving said lever across the arms and for insuring its registry with one and only one of them, at any one time, and means for moving said lever into engagement with the arm registered therewith, thereby to move the latter against and to actuate the rocker arm, the shifter arms being arranged differently from one another, with respect to the rocker arm, so that movements imparted thereto by them will vary, depending upon which shifter arm is moved, the first mentioned means being automatically controlled by a speed responsive device, the second mentioned means being under personal control.

10. In an automotive vehicle, a change speed transmission adapted to connect a drive shaft to a driven shaft, a plurality of change speed members adapted by movement thereof to create different drive connections in said transmission, a movable member, a selector adapted to connect said movable member to any of said change speed members individually, and speed sensitive means operated by said driven shaft for positioning said selector relative to said change speed members.

11. In an automotive vehicle having a clutch pedal and a change speed transmission adapted to connect a drive shaft to a driven shaft, a plurality of change speed members adapted by movement thereof to create different drive connections in said transmission, a movable member, a selector adapted to connect said movable member to any of said change speed members individually, said movable member being normally spaced from said selector whereby a predetermined amount of travel is necessary to move said movable member into engagement with said selector and speed sensitive means operated by said driven shaft for positioning said selector relative to said change speed members.

12. In an automotive vehicle having a driven shaft whose speed corresponds to that of the vehicle and a change speed transmission adapted to connect a drive shaft to said driven shaft, a plurality of change speed members adapted by movements thereof to create different drive connections in said transmission, a movable member, a selector adapted to connect said movable member to any of said change speed members individually, speed sensitive means for moving said selector from a position adjacent one of said change speed members to a position adjacent another change speed member as a result of acceleration or deceleration of said driven member, and means for deferring said movement of said selector for a defined period of acceleration or deceleration.

13. In an automotive vehicle having a driven shaft whose speed corresponds to that of the vehicle and a change speed transmission adapted to connect a drive shaft to said driven shaft, a plurality of change speed members adapted by movement thereof to create different drive connections in said transmission, a movable member, a selector adapted to connect said movable member to any of said change speed members individually, speed sensitive means for moving said selector from a position adjacent one of said change speed members to a position adjacent another change speed member as a result of acceleration or deceleration of said driven member, and means for deferring movement of said selector for a defined period during acceleration of said driven shaft and for a greater period during deceleration.

14. In an automotive vehicle, a change speed transmission, a selector for selecting different driving connections in said transmission, fluid pressure means for creating a selected connection, a manual control for said fluid pressure means, speed sensitive means responsive to the speed of the vehicle for moving said selector to different selective positions, and means for deferring movement of said selector for a predetermined period during acceleration and deceleration of said vehicle.

15. In an automotive vehicle, a change speed transmission, a selector for selecting different driving connections in said transmission, fluid pressure means for creating a selected condition, a manual control for said fluid pressure means, speed sensitive means responsive to the speed of the vehicle for moving said selector to different selective positions, and means for deferring movement of said selector for a predetermined period during acceleration and for a greater period during deceleration.

16. In an automotive vehicle having a clutch pedal, an accelerator pedal, and a change speed transmission, a plurality of change speed members, a selector for connecting said clutch pedal to different change speed members to create different driving connections in said transmission, speed sensitive means adapted to move said selector to connection with different change speed members, fluid pressure means for actuating said clutch pedal, and a control for said fluid pressure means connected to and operated by said accelerator pedal.

TRACY BROOKS TYLER.